(12) United States Patent
Yi et al.

(10) Patent No.: US 7,607,427 B2
(45) Date of Patent: Oct. 27, 2009

(54) SOLAR TRACKING DEVICE WITH SPRINGS

(75) Inventors: Jwo-Hwu Yi, Tainan (TW); Wen-Chwan Hwang, Tainan County (TW)

(73) Assignee: Kun Shan University, Yung-Kang (TW)

( * ) Notice: Subject to any disclaimer, the term of this patent is extended or adjusted under 35 U.S.C. 154(b) by 180 days.

(21) Appl. No.: 11/419,585

(22) Filed: May 22, 2006

(65) Prior Publication Data
US 2007/0012311 A1 Jan. 18, 2007

(51) Int. Cl.
*F24J 2/38* (2006.01)

(52) U.S. Cl. .................. 126/600; 126/571; 126/577; 126/578; 126/605; 126/606; 136/206; 136/214; 136/246; 250/203.4; 250/206.3

(58) Field of Classification Search .......... 126/600, 126/569, 604, 577, 578, 573, 571, 605, 606; 136/246, 214, 206; 250/203.4, 206.3
See application file for complete search history.

(56) References Cited

U.S. PATENT DOCUMENTS

| | | | | |
|---|---|---|---|---|
| 3,982,526 A | * | 9/1976 | Barak | 126/580 |
| 4,185,615 A | * | 1/1980 | Bottum | 126/601 |
| 4,275,712 A | * | 6/1981 | Baer | 126/601 |
| 4,283,588 A | * | 8/1981 | Zitzelsberger | 136/246 |
| 6,363,928 B1 | * | 4/2002 | Anderson, Jr. | 126/577 |
| 2004/0112373 A1 | * | 6/2004 | Djeu | 126/604 |
| 2006/0118105 A1 | * | 6/2006 | Hon | 126/600 |

* cited by examiner

*Primary Examiner*—Steven B McAllister
*Assistant Examiner*—Avinash Savani
(74) *Attorney, Agent, or Firm*—Alan Kamrath; Kamrath & Associates PA

(57) ABSTRACT

A solar tracking device for overcoming the disadvantages of a conventional solar energy system utilizing motors and to lower electricity consumption and decrease cost is provided. The device includes a solar module or solar collector supported by two springs under both ends and two water tanks on both ends. The solar module or solar collector, similar to a heliostat, is adapted to slowly revolve in response to the imbalanced water tanks filled with different amount of water.

4 Claims, 1 Drawing Sheet

SOLAR TRACKING DEVICE WITH SPRINGS

BACKGROUND OF THE INVENTION

1. Field of Invention

The present invention relates to a solar tracking device and, more particularly, to a solar tracking device including a solar module or solar collector supported by two springs under both ends and two water tanks on both ends, wherein the solar module or solar collector, similar to a heliostat, is adapted to slowly revolve in response to the imbalanced water tanks filled with different amounts of water.

2. Related Art

A conventional heliostat type solar tracker for a solar energy system is adapted to slowly revolve by a motor. In a conventional solar energy system capable of generating 1 KW, its solar module has a weight of about 10 Kg. The solar module and other cooperating components such as a supporter may have a total weight of more than 100 Kg. Also, a solar collector is quite heavy. Thus, the revolving of the solar energy system by a motor may disadvantageously consume much energy and increase cost. This is not desired. Thus, a need for improvement exists.

SUMMARY OF THE INVENTION

It is therefore an object of the present invention to provide a solar tracking device for overcoming the disadvantages of conventional solar energy systems utilizing motors and which lowers electricity consumption and decreases cost.

It is another object of the present invention to provide a solar tracking device including one or more solar modules or solar collectors adapted to concentrate solar energy, with each of the one or more solar modules or solar collectors having first and second ends. One or more fulcrums enable the solar modules or solar collectors to revolve eastward or westward. One or more first water tanks are mounted on the first end of each of the one or more solar modules or solar collectors and have a first inlet and a first outlet. One or more second water tanks are mounted on the second end of each of the one or more solar modules or solar collectors and have a second inlet and a second outlet. One or more first springs, are secured to and support the underside of the first end of each of the one or more solar modules or solar collectors. One or more second springs are secured to and support the underside of the second end of each of the one or more solar modules or solar collectors. One or more angular movement measuring members are mounted at each of the one or more fulcrums for measuring the present tilt angle. Thus, filing water into the first water tank and/or draining water from the second water tank will compress the first spring and expand the second spring, filing water into the second water tank and/or draining water from the first water tank will compress the second spring and expand the first spring, and compression of the springs will move the solar modules or solar collectors so as to provide a solar tracking device without motors for a solar energy system.

The above and other objects, features and advantages of the present invention will become apparent from the following detailed description taken with the accompanying drawings.

DETAILED DESCRIPTION OF THE INVENTION

Figure 1:
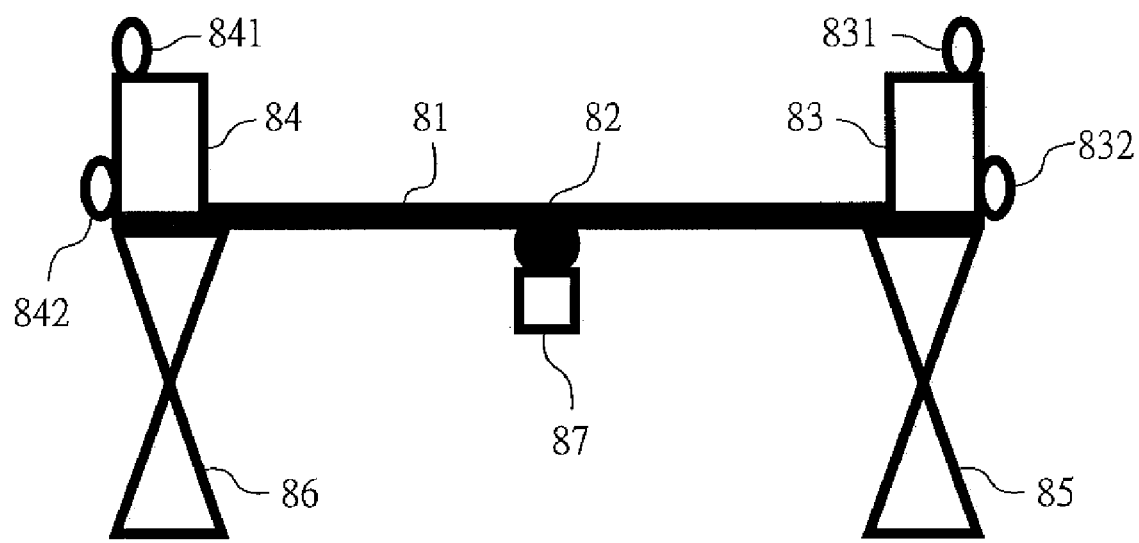
FIG. 1 schematically depicts a preferred embodiment of a solar tracking device with springs according to the invention.

Referring to FIG. 1, a solar tracking device in accordance with a preferred embodiment of the invention comprises a solar module or solar collector 81, an east spring 85, a west spring 86, an east water tank 83 and a west water tank 84. The solar module or solar collector 81 has a fulcrum 82 and an angular movement measuring member 87 mounted at the fulcrum 82. Each of the east and west springs 85 and 86 is secured to an underside of either end of the solar module or solar collector 81 as an elastic support. Each of the east and west water tanks 83 and 84 is mounted on either end of solar module or solar collector 81. The east water tank 83 has a top inlet 831 and a bottom outlet 832, and the west water tank 84 has a top inlet 841 and a bottom outlet 842.

Provided that there is no water in both of the east water tank 83 and west water tank 84 and that all inlets and outlets 831, 832, 841, and 842 are closed, the east spring 85 and the west spring 86 are balanced and the solar module or solar collector 81 is in a state of level. In the night, the inlet 831 of the east water tank 83 is opened to fill water until the east water thank 83 is full. As such, the east spring 85 is fully compressed (i.e., its height is in a lowest point). Also, the solar module or solar collector 81 faces the east. As the sun moves from east to west approximately 15° per hour, a clockwork mechanism (not shown) can be provided to control the amount and period of water flowing from the east water tank 83 so that the solar module or solar collector 81 revolves about the fulcrum 82 at an angle of 15° per hour for precisely tracking the position of the sun. The solar module or solar collector 81 may be adjusted to revolve about the fulcrum 82 at an angle of 7.5° per half-hour, an angle of 3.75° per 15 minutes, or an angle of 2.5° per 10 minutes by controlling the amount and period of water flowing from the east water tank 83.

An embodiment of a solar tracking device according to the invention wherein the solar module or solar collector 81 revolves about the fulcrum 82 at an angle of 2.5° per 10 minutes will be described in detail hereinafter. Ten minutes after sunrise, the outlet 832 of the east water tank 83 is opened to flow off water. In response, the east spring 85 expands upward a small distance. Also, in response, the solar module or solar collector 81 tilts toward the west a small angle by turning about the fulcrum 82. The water flowing off will stop by shutting off the outlet 832 when the angular movement measuring member 87 measures that the tilt angle reaches 2.5°.

After another ten minutes has elapsed, the outlet 832 of the east water tank 83 is opened again to flow off water. In response, the east spring 85 expands upward another small distance. Also in response, the solar module or solar collector 81 further tilts toward the west another small angle by turning about the fulcrum 82. The water flowing off will stop by shutting off the outlet 832 when the angular movement measuring member 87 measures that the tilt angle reaches another 2.5°.

The step discussed in the previous paragraph will continue until there is no water in the east water tank 83. In this state, no water is in both of the east water tank 83 and west water tank 84, all inlets and outlets 831, 832, 841, and 842 are closed, the east spring 85 and the west spring 86 are balanced again, and thus the solar module or solar collector 81 is disposed in a horizontal position.

Next, the inlet 841 of the west water tank 84 is opened to fill water therein. In response, the west spring 86 is compressed gradually and the horizontal solar module or solar collector 81 begins to tilt toward the west a small angle by turning about the fulcrum 82. The water filling will stop by shutting off the inlet 841 when the angular movement measuring member 87 measures that the tilt angle reaches 2.5°.

After ten minutes has elapsed, the inlet 841 of the west water tank 84 is opened to fill water therein again. In response, the west spring 86 is further compressed gradually, the solar module and solar collector 81 further tilts toward the west a small angle by turning about the fulcrum 82. The water filling will stop by shutting off the inlet 841 when the angular movement measuring member 87 measures that the tilt angle reaches another 2.5°.

The step discussed in the previous paragraph will continue until the west water tank 84 is full of water. In this state, the west spring 86 is fully compressed (i.e., its height is in a lowest point). Also, the solar module or solar collector 81 faces the west.

Finally, the outlet 842 of the west water tank 84 is opened to flow off water after sundown. This solar tracking cycle is thus completed.

Note that all of the above inlet openings for water filling and outlet openings for water flowing off as well as closings associated therewith are done automatically by actuating a clockwork mechanism.

By replacing motors with springs, the advantages over the prior art devices described herein include relatively lower cost and significantly lower electricity consumption than conventional devices utilizing motors. Moreover, for precisely tracking the position of the sun, motors of the conventional devices are required to be activated frequently. Thus, electricity consumption increases. In the present invention, the springs 85 and 86 are gradually compressed and the solar module or solar collector 81 therefore revolves gradually to track the position of the sun all the time.

Furthermore, since solar altitude angle varies with time, the solar module or solar collector 81 can be modified to be oriented with its longitudinal axis in a north-south direction for north-south tracking so that the tilt angle of the solar module or solar collector 81 changes with solar altitude angle without motors.

Also, solar modules or solar collectors respectively oriented with a longitudinal axis in an east-west direction and a north-south direction can be provided simultaneously so that the tilt angles of the solar modules or solar collectors 81 change with solar altitude angle and solar azimuth angle without motors.

While the invention herein disclosed has been described by means of specific embodiments, numerous modifications and variations could be made thereto by those skilled in the art without departing from the scope and spirit of the invention set forth in the claims.

What is claimed is:

1. A solar tracking device comprising:
   a solar module or solar collector adapted to concentrate solar energy, with the solar module or solar collector having first and second ends;
   a fulcrum located between the first and second ends of the solar module or solar collector to revolve eastward or westward;
   a first water tank mounted on the first end of the solar module or solar collector and having a first inlet and a first outlet;
   a second water tank mounted on the second end of the solar module or solar collector and having a second inlet and a second outlet;
   a first spring secured to and supporting an underside of the first end of the solar module or solar collector, with the first spring compressing as the solar module or solar collector pivots about the fulcrum with the first end moving down and the second end moving up;
   a second spring secured to and supporting an underside of the second end of the solar module or solar collector, with the second spring compressing as the solar module or solar collector pivots about the fulcrum with the first end moving up and the second end moving down; and
   an angular movement measuring member mounted at the fulcrum for measuring tilt angle;
   whereby filling water into the first water tank and draining water from the second water tank under the control of the angular movement measuring member will compress the first spring and expand the second spring, filling water into the second water tank during an afternoon period and draining water from the first water tank during a morning period under the control of the angular movement measuring member will compress the second spring and expand the first spring, and compression of the springs will move the solar module or solar collector so as to provide a solar tracking device without motors for a solar energy system.

2. The solar tracking device of claim 1, wherein the solar module or solar collector is oriented with its longitudinal axis in an east-west direction for east-west tracking.

3. The solar tracking device of claim 1, wherein the solar module or solar collector is oriented with its longitudinal axis in a north-south direction for north-south tracking.

4. The solar tracking device of claim 1, wherein the solar module or solar collector is oriented with its longitudinal axis in an east-west direction for east-west tracking and another solar tracking device has the solar module or solar collector oriented with its longitudinal axis in a north-south direction for north-south tracking.

* * * * *